(12) United States Patent
Kyritsis

(10) Patent No.: US 10,513,980 B2
(45) Date of Patent: Dec. 24, 2019

(54) GAS TURBINE ENGINE ARRANGEMENT

(71) Applicant: ROLLS-ROYCE plc, London (GB)

(72) Inventor: Vasileios Kyritsis, Derby (GB)

(73) Assignee: ROLLS-ROYCE PLC, London (GB)

(*) Notice: Subject to any disclaimer, the term of this patent is extended or adjusted under 35 U.S.C. 154(b) by 212 days.

(21) Appl. No.: 15/877,930

(22) Filed: Jan. 23, 2018

(65) Prior Publication Data
US 2018/0245514 A1 Aug. 30, 2018

(30) Foreign Application Priority Data

Jan. 24, 2017 (GR) .............................. 20170100025

(51) Int. Cl.
F02C 7/055 (2006.01)
F02K 3/06 (2006.01)

(52) U.S. Cl.
CPC ............... F02C 7/055 (2013.01); F02K 3/06 (2013.01); F05D 2220/32 (2013.01); F05D 2260/83 (2013.01)

(58) Field of Classification Search
CPC ........ F01D 25/00; F04D 29/70; F04D 29/701; F04D 29/703; F02C 7/045; F02C 7/05; F02C 7/052; F02C 7/055; F02C 7/057; F05D 2260/83; F02K 3/06
See application file for complete search history.

(56) References Cited

U.S. PATENT DOCUMENTS

| 2,546,153 A | 3/1951 | De Remer | |
| 2,623,610 A | 12/1952 | Buechel | |
| 2,680,345 A | 6/1954 | Frost | |
| 2,835,342 A * | 5/1958 | Hockert | B64D 33/02 55/306 |
| 6,598,384 B1 * | 7/2003 | Adkins | B64F 1/26 415/121.2 |
| 2010/0284791 A1 | 11/2010 | Flores | |

FOREIGN PATENT DOCUMENTS

| GB | 734091 | 7/1955 |
| GB | 757724 | 9/1956 |
| GB | 353646 | 11/1960 |
| GB | 2339242 | 1/2000 |

OTHER PUBLICATIONS

Great Britain Search Report issued in GB Patent Application No. 1703944.7 dated Sep. 6, 2017.

* cited by examiner

Primary Examiner — Nathaniel E Wiehe
Assistant Examiner — Michael K. Reitz
(74) Attorney, Agent, or Firm — Oliff PLC

(57) ABSTRACT

A gas turbine engine arrangement comprising a gas turbine engine and an inlet screen. The gas turbine engine comprises an engine core comprising an inlet having a radial extent extending from an engine longitudinal axis to a first radial position, and a fan duct comprising an inlet having a radial extent extending from the first radial position to a fan casing, the inlet screen comprising an at least part annular porous grid radially extending across at least part of the radial extent of the fan duct inlet, and not extending across any substantial part of the radial extent of the core inlet.

10 Claims, 3 Drawing Sheets

GAS TURBINE ENGINE ARRANGEMENT

CROSS-REFERENCE TO RELATED APPLICATION

This application is based upon and claims the benefit of priority from Greek Patent Application No. 20170100025 filed 24 Jan. 2017, the entire contents of which are incorporated herein.

BACKGROUND

1. Field of the Disclosure

The present disclosure concerns an arrangement comprising an inlet screen for a ducted fan gas turbine engine.

2. Description of the Related Art

Ducted fan gas turbine engines comprise an engine core, comprising a compressor, combustor and turbine, and a ducted fan, which directs air to the core and to a bypass duct. Prior to entry into service, an aircraft gas turbine engine must be tested to confirm that it complies with various regulatory requirements. Some of these tests involve reaching or exceeding fan and/or low pressure (LP) turbine redline speed for reasons of testing bird ingestion for the fan, or investigating mechanical response for the components on the LP shaft. Consequently, in order to perform this at Sea Level conditions, i.e. conditions different to the in-flight conditions, the LP shaft speed is increased, which may require unrepresentatively higher core power and which may in turn overly stress the engine.

Accordingly, the present invention seeks to provide a gas turbine engine arrangement and a method of testing a gas turbine engine which overcomes or ameliorates this problem.

SUMMARY

According to a first aspect there is provided a gas turbine engine arrangement including a gas turbine engine and an inlet screen, the gas turbine engine including an engine core comprising an inlet having a radial extent extending from an engine longitudinal axis to a first radial position, and a fan duct inlet having a radial extent extending from the first radial position to a fan casing, the inlet screen including an at least part annular porous grid radially extending across at least part of the radial extent of the fan duct inlet, and not extending across any substantial part of the radial extent of the core inlet.

Consequently, a porous grid is provided, which extends at least part way across the fan duct, while leaving the core duct unobstructed. It has been found that such an arrangement reduces fan inlet total pressure and consequently fan ingested mass-flow at the radially outward section. Consequently, the fan and hence the LP shaft and LP shaft components can be run at comparatively higher rotational speeds when testing at a given core power output, compared to where the inlet screen is not provided. Equivalently, a target mechanical LP shaft speed can be reached at reduced core power levels. Meanwhile, flow to the core is unobstructed, permitting high core flows, and so undisturbed high core power. Furthermore, in view of the reduced fan inlet pressure, reduced levels of bypass thrust result, which reduces the mechanical load transmitted through the engine structure at a given core power output.

The inlet screen may comprise a part circumferential gap extending across at least part of the radial extent of the fan duct inlet. Advantageously, an unobstructed area may be provided in the inlet to allow for bird strike testing.

The inlet screen may comprise a first portion comprising a first porosity, and a second portion radially outwardly of the first portion having a second porosity, the second porosity being lower than the first porosity. Advantageously, fan inlet total pressure is increased at the radially inner portion of the fan adjacent the core inlet, relative to the radially outer portion of the fan inlet. Consequently, fan inlet total and static pressure changes gradually from the outer radius to the inner radius, thereby avoiding sudden changes in streamline curvature, which would otherwise lead to aerodynamic instability of the core and/or the fan and/or aero-mechanical interactions.

The inlet screen may be configured to provide a total pressure drop of air through the porous grid of up to 20%, and preferably up to 15%, and may be configured to provide a total pressure drop of approximately 10%. Advantageously, it has been found that a pressure drop of ~8-10% can be advantageous in permitting Sea-Level testing at test-target LP shaft rotational speeds with representative core power output, and without providing turbulent air to the core inlet.

The inlet screen may be provided within the fan casing upstream of the fan and downstream of the fan duct inlet. Advantageously, by providing the inlet screen within the fan casing, close to the fan, mixing of the low total pressure and high total pressure streams downstream of the inlet screen is minimised.

The gas turbine engine arrangement may comprise a bell mouth inlet upstream of the fan casing. The inlet screen may be provided between the bell mouth inlet and the fan duct inlet.

According to a second aspect of the invention there is provided a method of testing a gas turbine engine, the method including; providing a gas turbine engine arrangement in accordance with the first aspect of the invention; running the engine at high fan speed conditions; and assessing an engine performance characteristic.

The method may comprise projecting a foreign object into the engine during running of the engine at high fan speed conditions.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
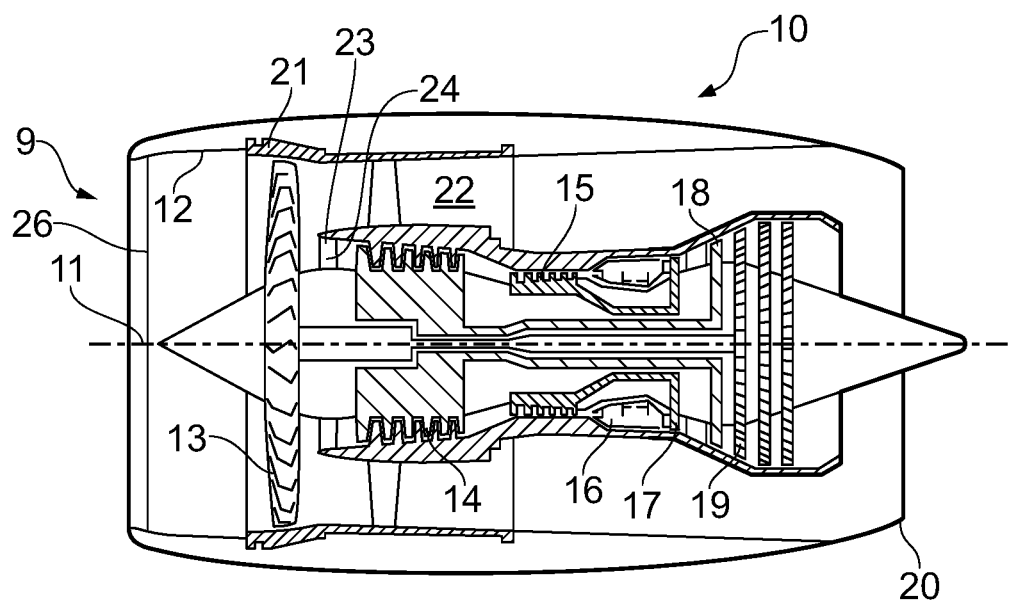
FIG. 1 is a sectional side view of a gas turbine engine.

With reference to FIG. 1, a gas turbine engine arrangement is generally indicated at 10 comprising a gas turbine engine 9 having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A fan casing 21 generally surrounds the engine 10 and defines the intake 12.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place. A core inlet lip 23 is provided at a first radial position, which divides the fan duct 22 from a core air inlet 24.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The gas turbine engine 10 arrangement further comprises an inlet screen 26 positioned within the fan casing 21, axially forwardly of the fan 13 and core intake 24, but downstream of an intake 12 to the fan casing 21, and located within the fan casing 21. It will be understood that the inlet screen 26 could be located forwardly of the fan casing 21, within a dedicated bell mouth inlet duct 27 (as shown in FIG. 3) or between the bell mouth inlet duct 27 and the fan casing 21 for testing purposes.

Figure 2:
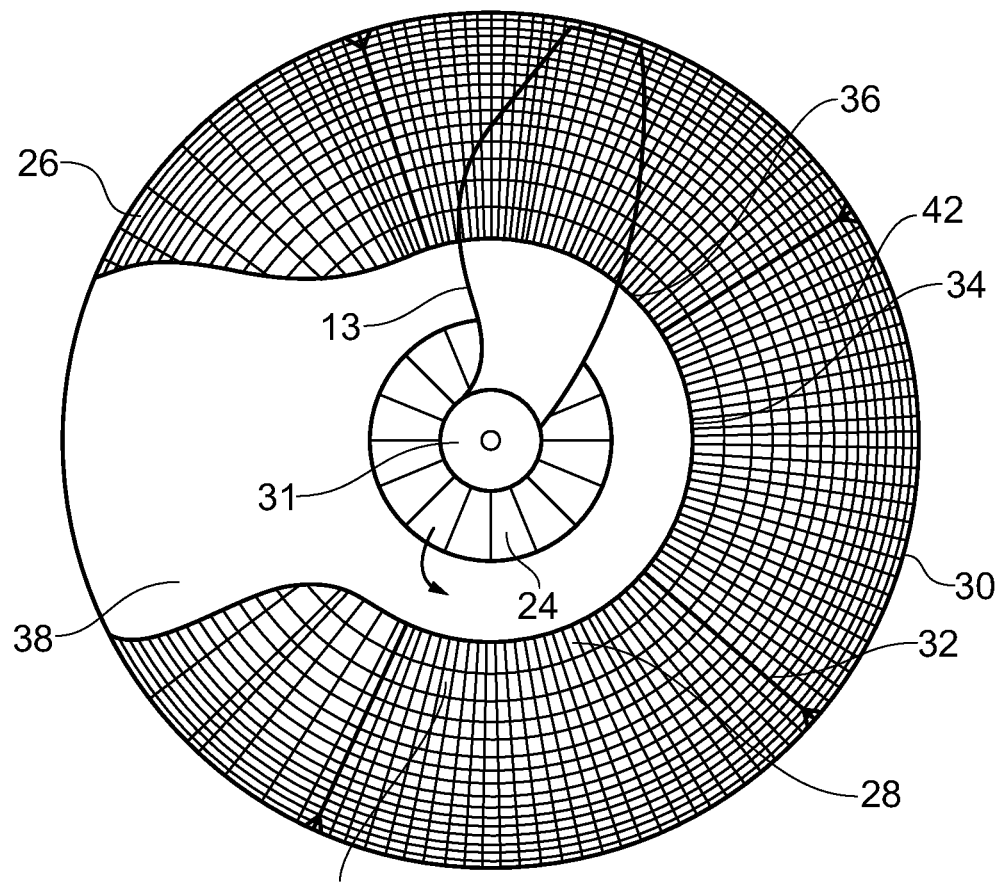
FIG. 2 is a front view of the engine of FIG. 1.
Figure 3:
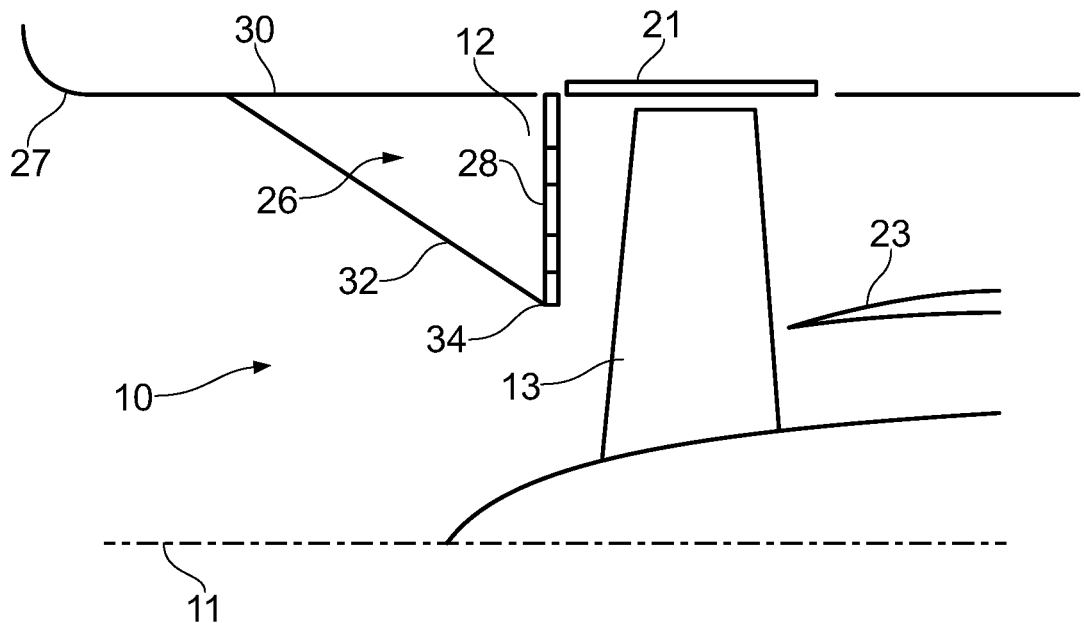
FIG. 3 is a sectional side view of a front part of the engine of FIG. 1.

Referring to FIGS. 2 and 3, the inlet screen 26 comprises a porous grid 28 defining a plurality of open holes through which air can flow to the fan 13 and core intake 24 downstream. The grid 28 provides an obstruction, thereby reducing the flow of air to the fan 13. The screen 26 extends between the fan casing 21 radially inwardly around part of the circumference of the inlet 12, and is generally planar, extending across a radially extending plane, normal to the engine rotational axis 11. It will be understood however that the grid 28 could take different forms, and could for example have a concave or convex shape and/or tangentially to the engine axis.

The inlet screen comprises a substantially circular support casing 30, which extends around the circumference of the screen, and matches the profile of the fan case 21, to thereby engage against the fan case 21, with the grid 28 being mounted to the support casing 30 such that the grid 28 extends to the fan case wall. Radial struts 32 extend radially inwardly from the support casing 30, with the grid 28 also being mounted to the struts 32. The struts 32 terminate in an inner casing 34, which interconnects the struts 32 and provides further support.

The inner casing 34 comprises a part circular region 36, which extends part way around the circumference of the core intake 24, radially outwardly thereof. The remainder of the inner casing extends from the ends of the part circular region, generally radially outwardly to the support casing 30, to define a gap region 38, where no grid 28 is provided from the longitudinal axis to the fan casing 21.

Consequently, the porous grid 28 extends from the radially outer fan casing 21, part way around the circumference of the casing 21, to an annularly inner end provided radially outwardly of the engine core intake 24. Optionally, the grid 28 is arranged to have radially and/or circumferentially varying porosity, with a higher porosity region 40 close to the inner casing 34, a lower porosity region 42 spaced further away from the inner casing and closer to the outer support casing 30. The grid porosity may be varied by adjusting the size of the holes in the grid 28. Consequently, the grid 28 porosity increases in proximity to the inner edge of the inlet screen 26. The radial and circumferential variation in grid porosity could be gradual, or could comprise a number of discrete "steps".

Figure 4:
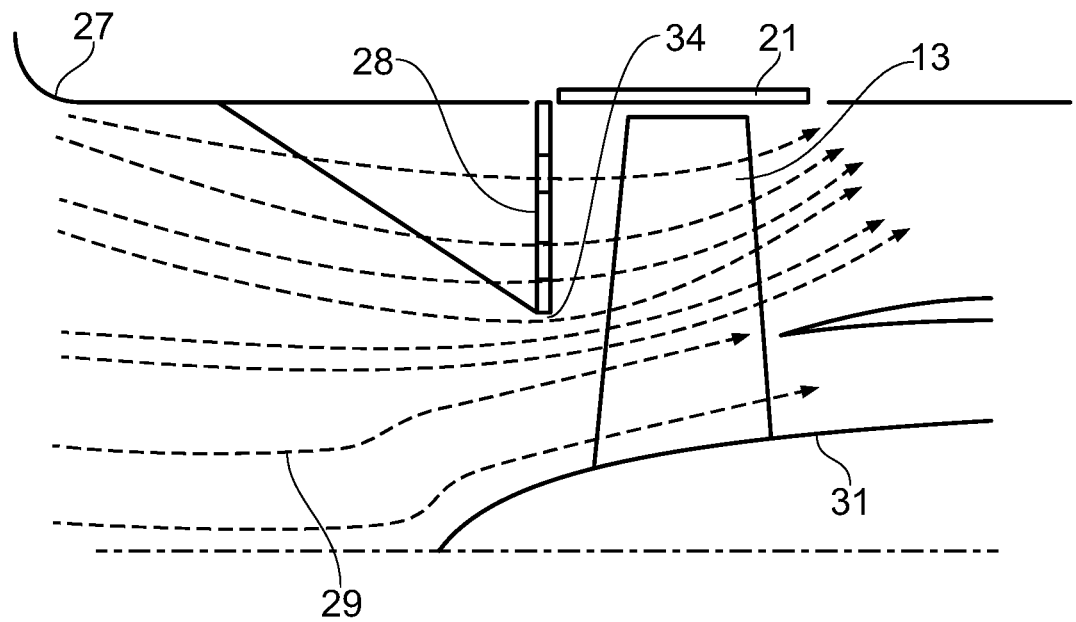
FIG. 4 is a sectional side view of the front part of the engine of FIG. 1 showing airflow through the engine in use.

Airflow through the inlet in use is shown diagrammatically in FIG. 4. Airflow direction through the inlet is shown by dashed lines 29. The density of flow lines approximately represents mass flow at various positions.

As can be seen, air entering the inlet through the bell mouth 27 at a radially inner positioning is directly radially outwardly by a fan hub 31 located at a radially inner position, to which the fan 13 is attached. Further radially outwardly, at the radial position between the radial position of the inner casing 34 and the hub, flow through the inlet is relatively unaffected, such that, at the fan 13 face, flow through this radial region can proceed relatively uninhibited.

At the radial position between the radially inner casing 34 and the fan casing 21, (i.e. at the radial position of the porous grid 28), flow into the inlet is restricted by the porous grid. Consequently, mass flow through the grid 28 at this radial position is reduced together with lower fan inlet total and static pressure. Static pressure will on the other hand be increased upstream of the grid 28 in view of the flow restriction. In view of this pressure distribution, with relatively low static pressure behind the grid 28, higher static pressure radially inwardly, and still higher static pressure upstream of the grid 28, flow from the region radially inward of the grid will be redirected radially outwardly, as shown in FIG. 4, thereby reducing the static pressure disparity, and smoothing flow. The extent of this flow redirection will depend on the static pressure differential, and the axial distance between the grid 28 and the fan 13. In general however, where the grid is present, mass flow at the radially outer positions will be reduced compared to mass flow where the grid is not present.

Furthermore, in order to reduce redirection of airflow, and so reduce local flow separation, the porosity of the grid increases in a radially inward direction (as described above in relation to FIG. 2). Consequently, the pressure differential between the upstream downstream sides of the grid 28 at the radially inner end is reduced relative to the radially outer end, preventing large turning of airflow.

Figure 5:
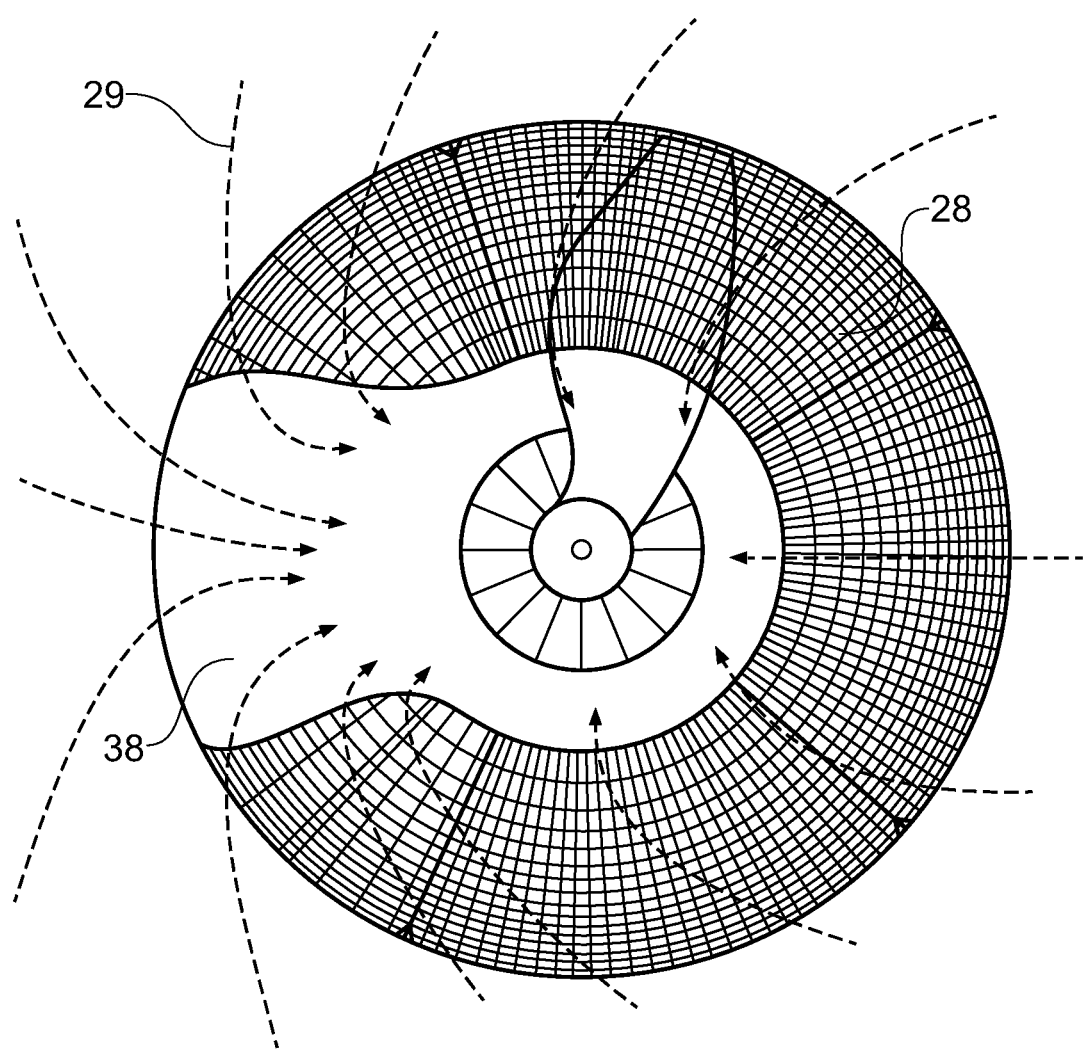
FIG. 5 is a front view of the engine of FIG. 1 showing airflow through the engine in use.

Similarly, FIG. 5 shows a similar view to FIG. 2, but includes flow lines 29 to indicate flow into the duct. As can be seen, a greater mass flow per unit area flows into the gap region 38 than the region covered by the grid 28. Furthermore, as described above, the grid 28 provides a pressure differential between the upstream and downstream sides of the grid 28. Consequently, a circumferentially extending pressure differential is setup, such that airflow tends to be directed toward the gap region 38. Again, in order to prevent excessive turning, and so flow separation, the porosity of the grid 28 varies circumferentially, such that a region of increased porosity is provided adjacent the gap region 38.

In one specific example, the grid porosity is arranged such that a total pressure drop across the inlet grid 28 of approximately 9% is provided across the bypass, with a pressure drop of substantially 0% being provided at the core inlet. In general, it is thought that a pressure drop of between 5 and 15% is desirable. Where the pressure drop is 9%, this has been calculated to result in a bypass mass flow reduction of approximately 7%, an axial Mach number at the fan face within the bypass zone in the region of 0.02, a fan circumferential Mach number increase in the region of 0.03. Thrust is reduced due to the reduced mass flow by approximately 10%, while fan rotational speed is reduced by approximately 3%. Fan working line is raised by approximately 2% in this example, but this is mitigated by an increase in cold nozzle area of approximately 2% resulting in no overall working line change. Consequently, there is no increased risk of fan flutter or stall, and fan working line conditions are on average representative of normal operation, without the inlet grid. On the other hand, core operation is substantially unaffected, due to the core inlet being unobstructed. Consequently, test operations with the inlet grid installed are highly representative of working conditions, while reducing engine core operating parameters such as temperatures and core speed at a fixed LP shaft speed, relatively to not applying the proposed grid configuration.

Consequently, a test procedure may be as follows. The screen 26 is installed as shown in FIG. 1, with the screen being provided upstream of the fan, within the fan case 21. The bell mouth (not shown) is then installed upstream of the fan case 21. A further foreign object damage (FOD) screen may be installed upstream of the bell mouth to avoid FOD ingestion for some testing.

In a FOD test, the FOD screen is omitted. The engine is run up to the target parameter, i.e. LP shaft mechanical speed representing end-of-runway conditions at kink-point day temperature, and a standardised impactor is projected toward the inlet, through the gap region 38, whereupon it strikes the fan 13. As an alternative example, during a test investigating rising stresses in the fan and/or LP turbine when operating up to 103%-105% of redline speed, the proposed grid in its circumferentially uniform version is installed. In both examples, the target LP shaft speeds can be achieved at reduced core engine operating temperatures and reduced mechanical loads through the engine structure compared to the case when the presented grid was not installed.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine arrangement comprising:
a gas turbine engine; and
an inlet screen,
wherein the gas turbine engine comprises an engine core comprising an inlet having a radial extent extending from an engine longitudinal axis to a first radial position, and a fan duct inlet having a radial extent extending from the first radial position to a fan casing, and
wherein the inlet screen comprises an at least part annular porous grid radially extending across at least part of the radial extent of the fan duct inlet, and not extending across any substantial part of the radial extent of the core inlet.

2. An arrangement according to claim 1, wherein the inlet screen comprises a part circumferential gap extending across at least part of the radial extent of the fan duct inlet.

3. An arrangement according to claim 1, wherein the inlet screen comprises a first portion comprising a first porosity, and a second portion radially outwardly of the first portion having a second porosity, the second porosity being lower than the first porosity.

4. An arrangement according to claim 3, wherein the porosity of the inlet screen decreases in a radially outward direction from a radially inner end.

5. An arrangement according to claim 4, wherein the inlet screen is configured to provide a total pressure drop of air entering the fan of approximately 10%.

6. An arrangement according to claim 1, wherein the inlet screen is configured to provide a total pressure drop of air entering the fan through the porous grid of up to 20%.

7. An arrangement according to claim 1, wherein the inlet screen is provided within the fan casing upstream of the fan and downstream of the fan duct inlet.

8. An arrangement according to claim 1, wherein the gas turbine engine arrangement comprises a bell mouth inlet upstream of the fan casing, and the inlet screen is provided between the bell mouth inlet and the fan duct inlet.

9. A method of testing a gas turbine engine, the method comprising:
providing a gas turbine engine arrangement comprising:
a gas turbine engine; and
an inlet screen,
wherein the gas turbine engine comprises an engine core comprising an inlet having a radial extent extending from an engine longitudinal axis to a first radial position, and a fan duct inlet having a radial extent extending from the first radial position to a fan casing, and
wherein the inlet screen comprises an at least part annular porous grid radially extending across at least part of the radial extent of the fan duct inlet, and not extending across any substantial part of the radial extent of the core inlet;
running the engine at high fan speed conditions; and
assessing an engine performance characteristic.

10. A method according to claim 9, wherein the method comprises projecting a foreign object into the engine during running of the engine at high fan speed conditions.

* * * * *